United States Patent [19]

Lettau et al.

[11] Patent Number: 5,761,066
[45] Date of Patent: Jun. 2, 1998

[54] DEVICE FOR REGULATING THE THICKNESS OF ROLLING STOCK

[75] Inventors: Ulrich Lettau, Erlangen; Matthias Mueller, Buckenhof; Siegbert Steidl, Herzogenaurach; Dietrich Wohld, Grossenseebach, all of Germany

[73] Assignee: Siemens Aktiengesellschaft, Munich, Germany

[21] Appl. No.: 604,001

[22] Filed: Feb. 20, 1996

[30] Foreign Application Priority Data

Feb. 20, 1995 [DE] Germany ............. 195 05 694.9

[51] Int. Cl.⁶ .................. B21B 37/16; B21B 37/28
[52] U.S. Cl. .................. 364/472.12; 72/9.2
[58] Field of Search .......... 364/472.12, 469.01; 72/6.1, 9.2, 11.8, 16.9, 7.2, 7.5, 8.1, 8.8, 11.5, 15.4, 16.1, 16.7, 18.5, 18.8; 324/229; 425/140, 141

[56] References Cited

U.S. PATENT DOCUMENTS

| | | | |
|---|---|---|---|
| 3,648,494 | 3/1972 | Lautenschlager | 72/8 |
| 4,222,254 | 9/1980 | King, Jr. et al. | 72/8 |
| 4,240,147 | 12/1980 | Morooka et al. | 364/472 |
| 4,428,054 | 1/1984 | Aizawa et al. | 364/472 |
| 4,648,257 | 3/1987 | Oliver et al. | 72/16 |
| 4,691,547 | 9/1987 | Teoh et al. | 72/16 |
| 4,907,434 | 3/1990 | Hoshino et al. | 72/8 |
| 4,931,982 | 6/1990 | Hayashida et al. | 364/473 |
| 5,158,724 | 10/1992 | Yagi et al. | 264/40.1 |
| 5,262,101 | 11/1993 | Yagi et al. | 264/40.1 |
| 5,341,663 | 8/1994 | Knapp | 72/8 |
| 5,586,221 | 12/1996 | Isik et al. | 395/22 |

FOREIGN PATENT DOCUMENTS

| | | | |
|---|---|---|---|
| 0 575 636 | 12/1993 | European Pat. Off. | G05D 5/03 |
| 56-160819 | 12/1981 | Japan | B21B 37/12 |

OTHER PUBLICATIONS

Hishikawa, et al., "New Control Techniques For Cold Rolling Mills Applications To Aluminum Rolling", 1990, Hitachi Review, vol. 39, No. 4, pp. 221–230.

*Primary Examiner*—James P. Trammell
*Assistant Examiner*—Tony M. Cole
*Attorney, Agent, or Firm*—Kenyon & Kenyon

[57] ABSTRACT

A device is provided for regulating the thickness of rolling stock in a roller stand. The device includes a control device that controls the roller adjustment of the roller stand as a function of the deviation between a reference thickness value (h*) and an estimated value (h') for the thickness of the rolling stock exiting from the roller stand; a model simulating the rolling process in the roller stand, the model calculating the estimated value (h') on the basis of roller technology parameters and measured values; a thickness measurement device that measures the thickness of the rolling stock after its exit from the roller stand with a measurement delay ($T_L$) providing a measured thickness value ($h_L$); a delay device for delaying the estimated value (h') determined by the model by at least approximately the amount of the measurement delay ($T_L$); a correction device generating a correction value (k) as a function of a deviation ($\Delta h_L$) between the measured thickness value ($h_L$) and a delayed estimated value ($h'_L$), the correction value (k) correcting the estimated value (h') provided by the model; a controllable switching device enabling the generation of the correction value (k) to be stopped in time periods during which the thickness measurement device provides no measured thickness values ($h_L$) or no usable measured thickness values; and a holding device making available during the time periods the correction value (k) last generated for correction of the estimated value (h') provided by the model prior to the generation of the correction value (k) being stopped.

11 Claims, 3 Drawing Sheets

DEVICE FOR REGULATING THE THICKNESS OF ROLLING STOCK

FIELD OF THE INVENTION

The present invention relates to devices for regulating the thickness of rolling stock.

BACKGROUND OF THE INVENTION

When regulating the thickness of rolling stock in a roller stand, it is difficult to measure the thickness of the rolling stock (the regulation variable of interest) as the thickness cannot be measured directly at the site of the stock formation, i.e., at the roller nip. Thickness measurements cannot be made directly at the roller nip because, for design reasons, the thickness measurement device for measuring the thickness of the rolling stock is always located a certain distance away from the roller stand in the direction of movement of the rolling stock. The measured thickness, which is accordingly measured with a measurement delay relative to the roller nip, cannot be used directly for thickness regulation.

A known device for regulating the thickness of rolling stock in a roller stand is disclosed in Hitachi Review 39 (1990), pages 221 to 230. As shown in FIG. 6 of that reference, an estimated value for the thickness of the rolling stock exiting from the roller nip is calculated in a model of the rolling process and used as a regulation variable. In order to compensate for inaccuracies of the model, the calculated estimated value is delayed by the amount of the measurement delay, and subsequently compared with the measured thickness value provided by the thickness measurement device. A correction value used to correct the estimated value calculated using the model and used as the regulation variable is determined as a function of the deviation of the delayed estimated value from the measured thickness value determined in this process.

Another possible device for regulating the thickness of rolling stock in a roller stand is the predictor regulation device disclosed in EP-A-0 575 636. In this device, the setting signal for adjusting the roller adjustment is delayed, in a setting signal monitoring device, by the amount of the measurement delay with which the thickness of the rolling stock exiting from the roller stand is measured. A prediction value for the thickness of the rolling stock at the location of the setting intervention, i.e., the roller nip, is determined in a predictor, as a function of the difference between the thickness measurement signal and the delayed setting signal. The predictor also acts as a filter that evens out the difference between the thickness measurement signal and the delayed setting signal, so that stability problems in regulating the thickness, which can occur as a result of inaccuracies in the reproduction of the rolling process and the measurement delay in the setting signal monitoring device, are avoided.

The operators of modern rolling lines increasingly demand adherence to close tolerance values for the thickness of the rolling stock, including in the initial region of the rolling stock or, in other words, in the region of the so-called strip head. The known devices for regulating thickness, however, are not able to provide this because the thickness of the rolling stock cannot be regulated during the period of time that passes until the strip head moves from the roller stand to the thickness measurement device, and until the device for regulating the thickness has subsequently adjusted itself. For example, when using the predictor regulation device, the predicted value for the thickness of the rolling stock cannot be set until a certain number of measured thickness values is available. Furthermore, particularly when rolling thin strips, the strip heads very often lift off from the run-out roller table, resulting in unusable measured thickness values from the thickness measurement device and therefore in unusable results from the thickness regulation device. This problem can continue until the strip is grasped by a winder at the end of the run-out roller table and a defined strip tension is exerted on it.

OBJECTS AND SUMMARY OF THE INVENTION

An object of the present invention is to enable the thickness of the rolling stock to be regulated even if measured thickness values are absent or unusable, particularly in the region of the strip head.

This and other objects are accomplished by a device for regulating the thickness of rolling stock in a roller stand, which roller stand includes a roller adjustment. The device includes a control device that controls the roller adjustment of the roller stand as a function of the deviation between a reference thickness value ($h^*$) and an estimated value ($h'$) for the thickness of the rolling stock exiting from the roller stand; a model simulating the rolling process in the roller stand, the model calculating the estimated value ($h'$) on the basis of roller technology parameters and measured values; a thickness measurement device that measures the thickness of the rolling stock after its exit from the roller stand with a measurement delay ($T_L$) providing a measured thickness value ($h_L$); a delay device for delaying the estimated value ($h'$) determined by the model by at least approximately the amount of the measurement delay ($T_L$); a correction device generating a correction value ($k$) as a function of a deviation ($\Delta h_L$) between the measured thickness value ($h_L$) and a delayed estimated value ($h'_L$), the correction value ($k$) correcting the estimated value ($h'$) provided by the model; a controllable switching device enabling the generation of the correction value ($k$) to be stopped in time periods during which the thickness measurement device provides no measured thickness values ($h_L$) or no usable measured thickness values; and a holding device making available during the time periods the correction value ($k$) last generated for correction of the estimated value ($h'$) provided by the model prior to the generation of the correction value ($k$) being stopped.

Compared to the device for regulating thickness known from the Hitachi Review reference previously mentioned, the device according to the invention also regulates thickness as a function of an estimated value for the thickness of the rolling stock, calculated in a model, where the estimated value is corrected with a correction value that is determined as a function of the measured thickness value. According to the invention, each time the thickness measurement device provides no measured thickness values or provides unusable ones, generation of the correction value is stopped, and the estimated value calculated by the model is corrected by the correction value last generated and made available by a holding device. This allows precise regulation of the thickness even when the measured thickness values are absent or unusable on the basis of the corrected estimated value calculated by the model.

For regulating the thickness of strips in the region of the strip head, generation of the correction value is turned off, and the correction value last generated during rolling of the preceding strip is made available, at least until the strip exiting from the roller stand has reached the thickness measurement device. Particularly in the case of thin strips, generation of the correction value as a function of the measured thickness value is not turned on again until the strip is grasped by a winder or another roller stand and a defined tension is exerted on it.

In order to increase the accuracy of the thickness regulation device in the time periods during which no new formation of the correction value occurs due to absent or unusable measured thickness values, the model of the rolling process in the roller stand and the estimated value provided by the model are constantly adjusted in an advantageous manner. The adjustment is made as a function of slowly changing rolling technology parameters, particularly roller heating and cooling, roller wear and bearing flotation. This particularly takes into consideration the fact that rollers heat up during each passage of the rolling stock and cool off between consecutive passages of the rolling stock, and therefore influence the thickness regulation in the roller nip. Preferably, the slowly changing rolling technology parameters are calculated by means of additional models.

The accuracy of the thickness regulation device can be further improved if the model of the rolling process has changeable model parameters that are adjustable by an optimization device as a function of the deviation between the measured thickness value and the delayed estimated value in the sense of reducing this deviation. The better the model simulates the rolling process in the roller stand, the lower the correction value and the lower the error if the correction value last generated in each instance is used for correction of the estimated value for the thickness of the rolling stock in the time intervals of absent or unusable measured thickness values. To adapt the model to the actual rolling process, the model can advantageously contain a neural network with adjustable network parameters.

In an advantageous embodiment of the device according to the invention, the estimated value provided by the model and corrected with the correction value is delayed in a delay device so that the deviation between the measured thickness value and the delayed corrected estimated value used to generate the correction value approaches zero on the average over time. The correction device can be implemented in particularly simple manner in that it has an integration device to which the deviation between the measured thickness value and the delayed corrected estimated value is provided on the input side, and which forms the holding device, at the same time.

In the device according to the invention, there is a particularly advantageous effect on the behavior of the thickness regulation device in that the estimated value calculated by the model, corrected and passed on to the control device together with the reference thickness value, follows changes in the roller nip practically without delay. In individual cases, however, stability problems can occur in the thickness regulation device in this connection. In order to avoid such stability problems, a predictor regulation device is additionally provided, in which a setting signal for adjusting the roller adjustment is delayed in a setting signal monitoring device, by the amount of the measurement delay between the roller stand and the thickness measurement device, and a prediction value for the thickness of the rolling stock exiting from the roller stand is determined by means of a predictor, from the difference between the measured thickness value and the delayed setting signal, and subtracted from the reference thickness value to generate the setting signal; in this connection, the prediction value and the estimated value provided by the model and subsequently corrected are linked in a mixing device to yield a mixed signal, before being subtracted from the reference thickness value. When rolling the strip head, when measured thickness values are not yet available, or they are unusable, the mix ratio of the corrected estimated value to the prediction value is adjusted to at least approximately one, and after usable measured thickness values are available, it is adjusted to a value between one and zero.

Preferably, the difference between a further mixed signal generated from the measured thickness value and the delayed corrected estimated value, and the delayed setting signal, is provided to the predictor, where the mix ratio can be adjusted as a function of the reliability of the measured thickness values.

Setting of the mix ratio as mentioned can be changed as a function of various factors, such as the reference thickness value, the standard deviation of the measured thickness value or the finished strip length. Furthermore, setting of the mix ratios can take place on the basis of fuzzy logic and/or using experience learned from neural networks.

DETAILED DESCRIPTION

Figure 1:
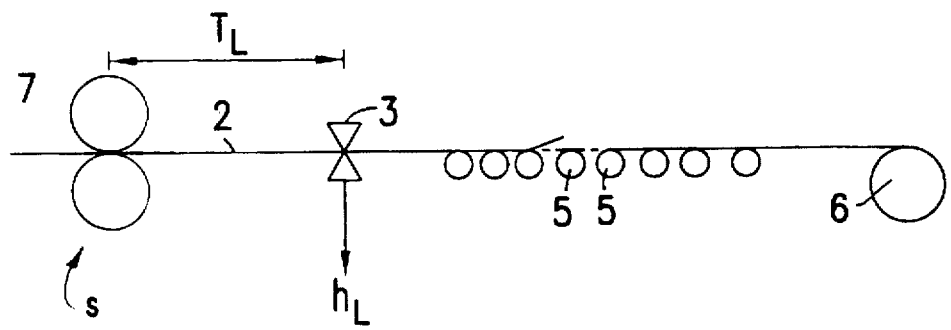
FIG. 1 is a schematic representation illustrating movement of rolling stock from a roller stand through a thickness measurement device and via a run-out roller table to a winder.

FIG. 1 shows a roller stand 1 (here, the end stand of a hot-rolling line) for regulating the thickness of rolling stock 2 (here, a metal strip) by means of a roller adjustment, which is adjusted by a setting signal s. The thickness of the rolled strip 2 is measured by a thickness measurement device 3, which generates a corresponding measured thickness signal $h_L$. For design reasons, the thickness measurement device 3 is arranged at a certain distance away from the roller stand 1 (in the movement direction of the strip 2) so that the thickness of the strip 2 is measured with a measurement delay $T_L$ as compared with the location of setting intervention, namely the roller nip. The measured thickness value $h_L$ can therefore not be used directly to regulate the thickness. Furthermore, it is only possible to regulate the thickness using the measured thickness values $h_L$ when the beginning of the metal strip 2, the so-called strip head, has passed through the distance from the roller stand 1 to the thickness measurement device 3. After the rolled strip 2 has passed by the thickness measurement device 3, it is transported to a winder 6 via a run-out roller table 5, and wound up at the winder, with a defined strip tension. Before the strip head reaches the winder 6, particularly in the case of thin strips 2, lifting of the strip head from the run-out roller table 5 can be observed, resulting in unusable measured thickness values $h_L$. By means of the device according to the invention, which will be described below using exemplary embodiments, regulating the thickness is possible even if, as explained above, there are no measured thickness values $h_L$ available or if these are unusable.

Figure 2:
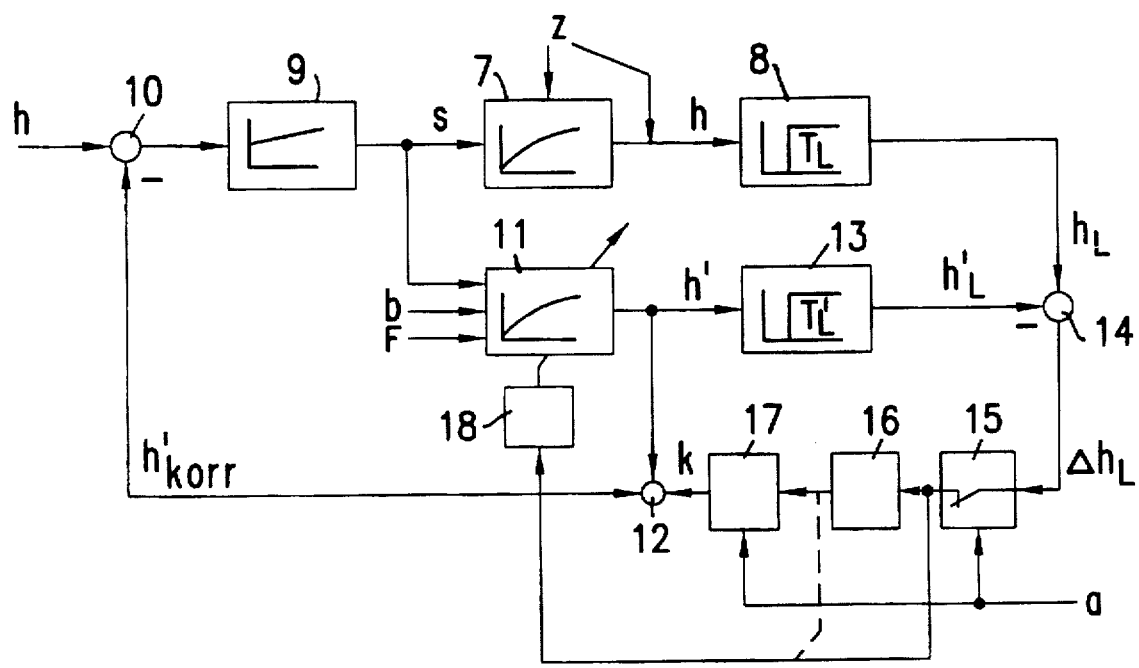
FIG. 2 is a block schematic diagram of an exemplary embodiment of the device for regulating the thickness of rolling stock according to the invention.

In FIG. 2, the control system comprising the roller stand 1 shown in FIG. 1 and the subordinate control loop circuit for controlling the roller adjustment, not shown, is represented in simplified form as a block schematic 7. The control system 7 receives the setting signal s as the input signal, and incidentally is influenced by interference z. At the output of the control system 7, the thickness h of the strip 2 exiting from the roller stand 1 is obtained. The circuit block 7 is followed by another circuit block 8 for the thickness measurement device 3 and the measurement delay device $T_L$, with which the measured thickness signal $h_L$ is generated.

The setting signal s is generated by a control device 9, here a regulator, as a function of the difference between a reference thickness value h* and a corrected estimated value $h'_{korr}$ of the thickness of the strip 2 exiting from the roller stand 1, which serves as the actual value, formed in a subtraction element 10. To generate the corrected estimated value $h'_{korr}$, an estimated value h' for the thickness of the strip 2 exiting from the roller stand 1 is calculated in a model 11 that simulates the rolling process in the roller stand 1, in other words, the control system 7 as a function of the setting signal s and additional roller technology parameters and measured values such as the measured roller force F and the strip width b.

In order to eliminate inaccuracies of the model 11 at least under stationary conditions, a correction value k is added to the estimated value h' in an adding element 12. To generate the correction value k, the estimated value h' provided by the model 11 is first delayed in a delay device 13, by an amount $T_L$ which at least approximately corresponds to the measurement delay $T_L$, and then subtracted from the measured thickness value $h_L$ in a subtraction element 14. The deviation $\Delta h_L$ between the delayed estimated value $h'_L$ and the measured thickness value $h_L$ is passed, via a controllable switching device 15, to a correction device 16, which generates the correction value k on its output side, as a function of the deviation $\Delta h_L$. The correction value k is passed to the adding element 12 via a controllable holding device 17.

As long as usable measured thickness values $h_L$ are provided by the thickness measurement device 3, the controllable switching device 15 is closed and the holder device 17 is deactivated, so that the correction device 16 constantly generates correction values k as a function of the deviation $\Delta h_L$, and the estimated value h' is constantly corrected with these correction values k, in the adding element 12. If, on the other hand, no measured thickness values $h_L$ or only unusable values are available, the controllable switching device 15 is opened by means of a control signal a, and at the same time, the holding device 17 is activated, so that no new correction values k are generated in the correction device 16. The last correction value k generated is stored in memory in the holding device 17 and made available by the latter for correction of the estimated value h' provided by the model. In this manner, it is possible to precisely regulate the thickness even if there are no measured thickness values $h_L$ or only unusable values available. When rolling metal strips 2, the control signal a is generated after every strip passage, and maintained until a confirmation is received from the winder 6, indicating that the winder 6 has grasped the strip head of the subsequent strip 2. During the time period that the strip head of the subsequent strip 2 needs for moving from the roller stand 1 to the winder 6, the thickness is regulated on the basis of the estimated value $h'_{korr}$ constantly calculated in the model 11 and corrected with the correction value k last determined for the previous strip.

The better the model 11 simulates the regulation segment 7, the smaller the correction value k and the smaller the error if the estimated value h' is corrected with the correction value k last generated and stored in memory in the holding device 17 during the time periods of absent or unusable measured thickness values $h_L$. For this reason, the model 11 is constantly adjusted to the actual rolling process, in that changeable model parameters of the model 11 are adjusted by means of an optimization device 18, as a function of the deviation $\Delta h_L$ between the measured thickness value $h_L$ and the delayed estimated value $h'_L$ in the sense of reducing this deviation $\Delta h_L$. For this purpose, either the deviation $\Delta h_L$ can be passed directly or the correction value k can be passed along the broken-line signal path to the optimization device 18.

Figure 3:
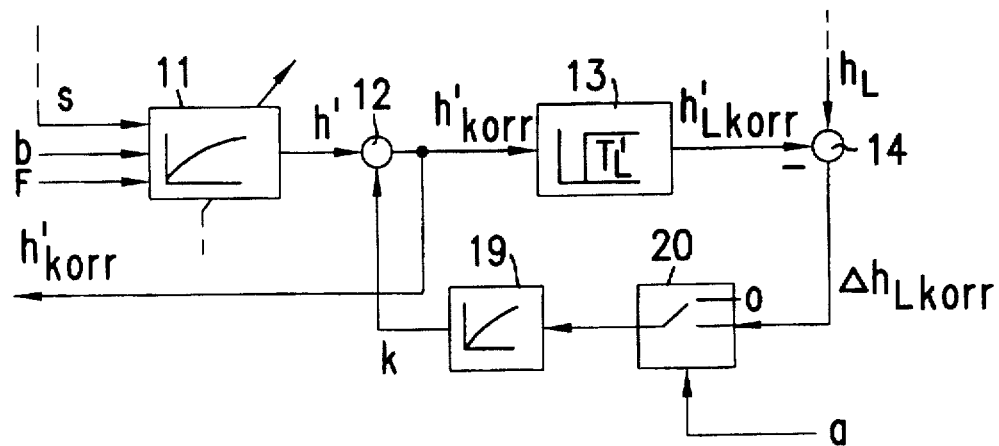
FIG. 3 is a block schematic diagram of a variant of the exemplary embodiment shown in FIG. 2.

FIG. 3 shows a detail of a variant of the device for regulating thickness shown in FIG. 1, with the significant difference being that the summation point 12 has been moved into the signal path between the model 11 and the delay device 13. As a result, the corrected estimated value $h'_{korr}$ instead of the estimated value h', is delayed in the delay device so that the generation of the correction value k takes place as a function of the difference $\Delta h_{Lkorr}$ between the measured thickness value $h_L$ and the delayed corrected estimated value $h'_{Lkorr}$. The result is that the deviation $\Delta h_{Lkorr}$ approaches zero on the average over time so that the correction device can consist, in particularly simple manner, of an integration device 19, which forms the holding device at the same time. In this connection, the controllable switching device is structured in the form of a change-over switch 20, which switches the deviation $\Delta h_{Lkorr}$ through to the integration device 19 if there is no control signal a, and connects the input of the integration device 19 with the value zero if the control signal a is present.

Figure 4:
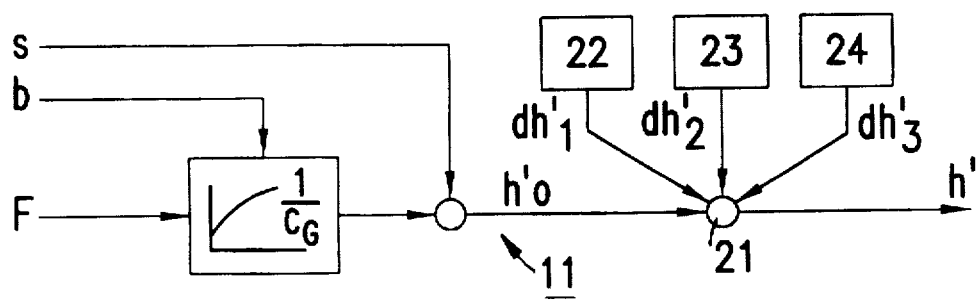
FIG. 4 is a schematic diagram illustrating an example of a model of the rolling process in the roller stand used in the device according to the invention.

FIG. 4 shows a very simple block schematic of the model 11, which is based on the so-called gaugemeter equation $F=c_G+(h-s)$ for the rolling force F, where $c_G$ designates the frame spring of the roller stand 1, h the thickness of the strip 2 exiting from the roller stand 1, and s the roller adjustment. The thickness value $h'_0$ calculated on the basis of this equation, also taking into consideration the strip width b, is corrected in a summation point 21 with additional values $dh'_1$, $dh'_2$, and $dh'_3$, which are calculated in additional models 22, 23, and 24, and take into consideration slowly changing roller technology parameters such as roller heating and cooling during passage of the strips or during strip gaps, roller wear and bearing flotation.

Figure 5:
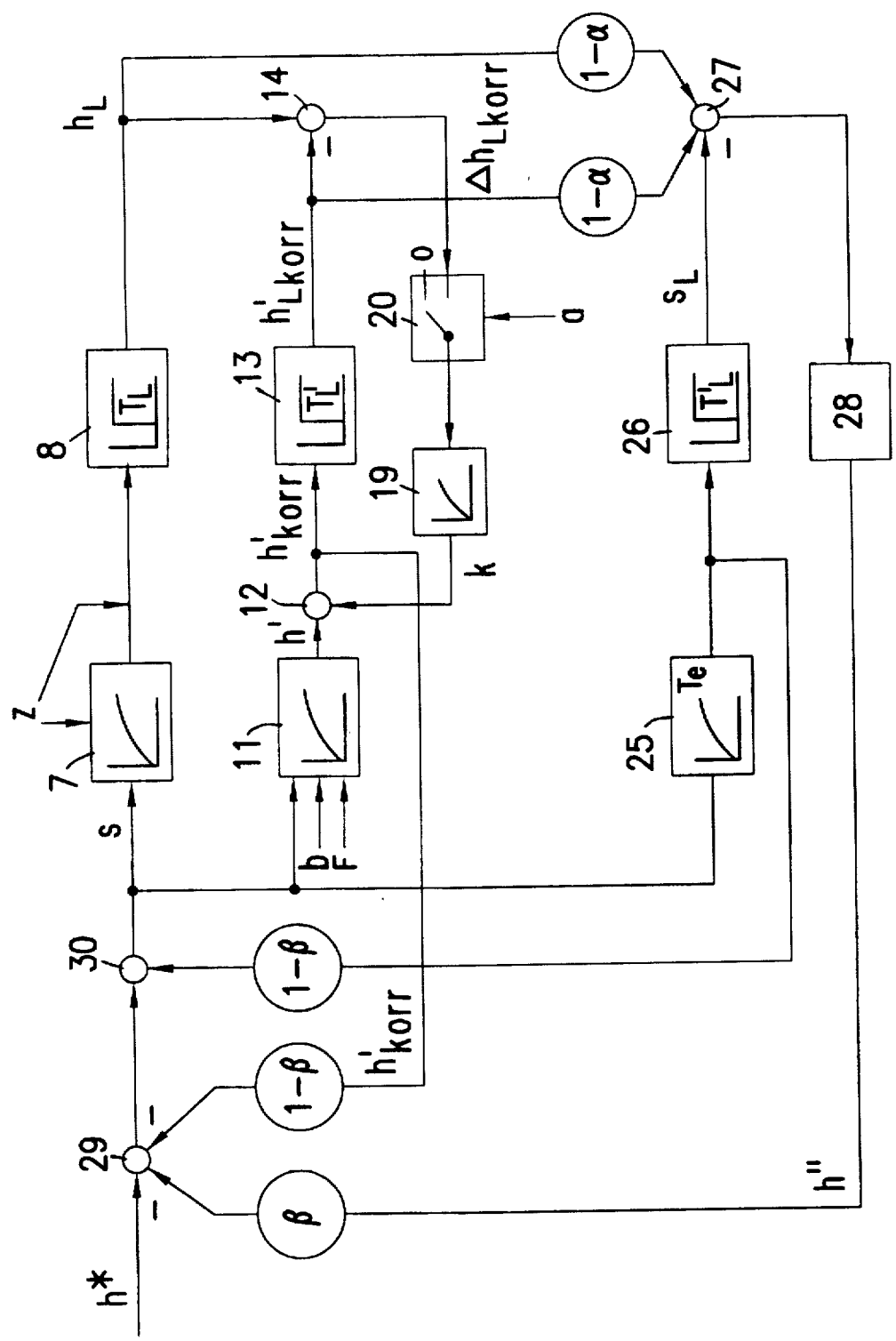
FIG. 5 is a schematic diagram illustrating an example of a combination of a thickness regulation device used according to the invention and a predictor regulation device.

FIG. 5 shows an example for supplementing the device for regulating thickness described above with a predictor regulation device. The circuit blocks 7 and 8 again refer to the control system comprising the roller stand 1 and the measurement delay $T_L$ of the thickness measurement device 3, which generate the measured thickness value $h_L$ from the setting signal s. Corresponding to the representation in FIG. 3, the estimated value h' is formed in the model 11 of the control system 7 as a function of the setting signal s, the roller force F and the strip width b, and corrected with the correction value k to yield the corrected estimated value $h'_{korr}$. To form the correction value k, the delayed corrected estimated value $h'_{Lkorr}$, delayed by the amount $T'_L$, is subtracted from the measured thickness value $h_L$ in the subtraction element 14, with the deviation $\Delta h_{Lkorr}$ obtained in this way being passed to the integration device 19, via the controllable switching device 20, to form the correction value k.

The additional predictor regulation device contains a setting signal monitoring device which consists of a transmission element 25, which reproduces the dynamics of the subordinate regulation circuit to control the roller adjustment (not shown) and a delay element 26 with a delay $T'_L$ which corresponds to the measurement delay $T_L$. The setting signal monitoring device 25, 26 generates a delayed signal $s_L$ from the setting signal s; this delayed signal $s_L$ is compared, in a subtraction element 27, with a mixed signal obtained from the measured thickness value $h_L$ and the delayed corrected estimated value $h'_{Lkorr}$. The comparison result obtained in this way is passed to a predictor 28. The mix ratio of the values $h_L$ and $h'_{Lkorr}$ is adjustable via a factor $\alpha$.

During those times when the measured thickness value $h_L$ is not yet reliably available, $\alpha=0$ is adjusted, and therefore the delayed corrected estimated value $h'_{Lkorr}$ is exclusively passed to the predictor 28. When the measured thickness value $h_L$ is reliable, the factor $\alpha$ can be increased ($0 \leq \alpha \leq 1$) and thus the measured thickness value $h_L$ can be given more weight. In this connection, it is preferable if the factor $\alpha$ is not increased suddenly, but rather in accordance with a constant, for example a linear time progression. In a normal case, the factor $\alpha$ is increased up to the value $\alpha=1$, and therefore the measured thickness value $h_L$ is exclusively passed on to the predictor 28. It is also possible, however, to pass a mixture of the delayed corrected estimated value $h'_{Lkorr}$ and the measured thickness value $h_L$, or the estimated value $h'_{Lkorr}$ exclusively, to the predictor 28 even when the measured thickness value $h_L$ is reliably present.

In the predictor 28, a prediction value h" for the thickness of the strip 2 exiting from the roller stand 1 is determined as a function of the comparison result at the output of the subtraction element 27, and linked, together with the corrected estimated value $h'_{korr}$ provided by the model 11 and corrected with the correction value k, to yield a mixed signal that is subtracted from the reference thickness value h* in a subtraction element 29. The mix ratio in this instance can be adjusted via a factor $\beta$.

In the case that $\beta=1$, the predictor regulation device is exclusively effective, where the setting signal s is formed directly from the difference between the reference thickness value h* and the prediction value h" provided by the predictor 28. In the case that $\beta=0$, the thickness regulation device described in FIGS. 2 to 4 is exclusively effective, where the setting signal s is formed by a control device 9, as a function of the difference between the reference thickness value h* and the corrected estimated value $h'_{korr}$ as shown in FIG. 2. In the exemplary embodiment in FIG. 5, the control device mentioned is formed by the transmission element 25, whose output signal is weighted with the factor 1−$\beta$ and added to the output signal of the subtraction element 29 in an adding element 30. On the basis of this feedback, the transmission element 25 forms a PI regulator between the subtraction element 29 and the input of the regulation segment 7.

The factor $\beta$ is set $\beta=0$ particularly when the strip head has not yet reached the thickness measurement device 3 or the winder 6, and accordingly, no measured thickness values $h_L$ or only unusable ones are available. This means that the thickness is regulated exclusively as a function of the corrected estimated value $h'_{korr}$.

What is claimed is:

1. A device for regulating the thickness of rolling stock in a roller stand, the roller stand including a roller adjustment, the device comprising:

a control device controlling the roller adjustment of the roller stand as a function of a deviation between a reference thickness value and an estimated value for the thickness of the rolling stock exiting from the roller stand;

a model simulating the rolling process in the roller stand, the model calculating the estimated value on the basis of roller technology parameters and measured values;

a thickness measurement device measuring the thickness of the rolling stock after its exit from the roller stand with a measurement delay and provide a measured thickness value;

a delay device delaying the estimated value determined by the model by at least approximately the amount of the measurement delay;

a correction device generating a correction value as a function of a deviation between the measured thickness value and a delayed estimated value said correction value correcting the estimated value provided by the model;

a controllable switching device enabling a generation of the correction value to be stopped in time periods during which the thickness measurement device provides no measured thickness values or no usable measured thickness values; and a holding device providing, during the time periods, the correction value last generated for correcting the estimated value provided by the model prior to the generation of the correction value being stopped.

2. The device of claim 1, wherein a generation of the correction value is stopped until the rolling stock exiting from the roller stand reaches the thickness measurement device.

3. The device of claim 1, wherein a generation of the correction value is stopped until the rolling stock exiting from the roller stand is grasped by a winder or another roller stand.

4. The device of claim 1, wherein the estimated value provided by the model is constantly adjusted as a function of slowly changing rolling technology parameters corresponding to at least one of roller heating and cooling, a roller wear and a bearing flotation.

5. The device of claim 1, further comprising additional models for calculating slowly changing rolling technology parameters.

6. The device of claim 1, wherein the model of the rolling process has changeable model parameters that are adjustable using an optimization device as a function of the deviation between the measured thickness value and the delayed estimated value reducing the deviation.

7. The device of claim 6, wherein the model includes a neural network.

8. The device of claim 1, wherein the estimated value provided by the model and corrected with the correction value is delayed in the delay device.

9. A device for regulating the thickness of rolling stock in a roller stand, the roller stand including a roller adjustment, the device comprising:

a control device controlling the roller adjustment of the roller stand as a function of a deviation between a reference thickness value and an estimated value for the thickness of the rolling stock exiting from the roller stand;

a model simulating the rolling process in the roller stand, the model calculating the estimated value on the basis of roller technology parameters and measured values;

a thickness measurement device measuring the thickness of the rolling stock after its exit from the roller stand with a measurement delay and provide a measured thickness value;

a delay device delaying the estimated value determined by the model by at least approximately the amount of the measurement delay;

a correction device generating a correction value as a function of a deviation between the measured thickness value and a delayed estimated value, said correction value correcting the estimated value provided by the model;

a controllable switching device enabling a generation of the correction value to be stopped in time periods during which the thickness measurement device provides no measured thickness values or no usable measured thickness values; and a holding device providing, during the time periods, the correction value last generated for correcting the estimated value provided by the model prior to the generation of the correction value being stopped, wherein the estimated value provided by the model and corrected with the correction value is delayed in the delay device, and wherein the correction device has an integration device in which the deviation between the measured thickness value ($h_L$) and the delayed corrected estimated value is input, the correction device also forming the holding device.

10. A device for regulating the thickness of rolling stock in a roller stand, the roller stand including a roller adjustment, the device comprising:

a control device controlling the roller adjustment of the roller stand as a function of a deviation between a reference thickness value and an estimated value for the thickness of the rolling stock exiting from the roller stand;

a model simulating the rolling process in the roller stand, the model calculating the estimated value on the basis of roller technology parameters and measured values;

a thickness measurement device measuring the thickness of the rolling stock after its exit from the roller stand with a measurement delay and provide a measured thickness value;

a delay device delaying the estimated value determined by the model by at least approximately the amount of the measurement delay;

a correction device generating a correction value as a function of a deviation between the measured thickness value and a delayed estimated value, said correction value correcting the estimated value provided by the model;

a controllable switching device enabling a generation of the correction value to be stopped in time periods during which the thickness measurement device provides no measured thickness values or no usable measured thickness values;

a holding device providing, during the time periods, the correction value last generated for correcting the estimated value provided by the model prior to the generation of the correction value being stopped; and a predictor regulation device, in which a setting signal for adjusting the roller adjustment is delayed in a setting signal monitoring device for a period corresponding to the measurement delay between the roller stand and the thickness measurement device, and in which a prediction value for the thickness of the rolling stock exiting from the roller stand is determined with a predictor from the difference between the measured thickness value and a delayed setting signal, and subtracted from the reference thickness value to generate the setting signal, and that the prediction value and the estimated value provided by the model and subsequently corrected are linked in a mixing device to yield a mixed signal, before being subtracted from the reference thickness value.

11. The device of claim 10, wherein, before determining the difference between the measured thickness value and the delayed setting signal, the measured thickness value is linked with the delayed corrected estimated value for the thickness of the rolling stock, in another mixing device, to yield another mixed signal.

* * * * *